United States Patent Office 3,455,727,
Patented July 15, 1969

3,455,727
SYNTHETIC MICROPOROUS POLYMERIC
SHEET MATERIAL COATED WITH AN
IMINATED BUTADIENE/METHACRY-
LATE POLYMER COMPOSITION
John I. Dye, Cornwall-on-Hudson, N.Y., assignor to E. I.
du Pont de Nemours and Company, Wilmington, Del.,
a corporation of Delaware
No Drawing. Continuation-in-part of application Ser. No.
453,216, May 4, 1965. This application May 31, 1966,
Ser. No. 553,643
Int. Cl. B32b 27/08, 33/00; B44f 9/12
U.S. Cl. 117—76  8 Claims

ABSTRACT OF THE DISCLOSURE

A coating composition for a leather-like synthetic microporous polymeric sheet material which is a pigmented aqueous dispersion of a butadiene/methacrylate polymer wherein the polymer has been reacted with imine such as ethyleneimine or propyleneimine.

---

This application is a continuation-in-part of the copending applciation Ser. No. 453,216, filed May 4, 1965, now abandoned.

This invention concerns a novel coating composition for coating synthetic microporous polymeric sheet materials. In particular, this invention relates to a coating composition of an aqueous dispersion of polymer which has a balance of properties which are essential to its utilization as a coating to protect microporous polymeric materials. More particularly, this invention concerns a coating composition of a polymer of methyl methacrylate/butadiene/$\alpha,\beta$-unsaturated carboxylic acid that has pendent monovalent radicals attached to the carbon atoms of the polymer backbone which provide the composition with desirable properties, such as, improved adhesion. When this coating composition is applied to a microporous polymeric sheet material and dried to a continuous coating, it has excellent adhesion to a microporous polymeric substrate in both wet and dry conditions, is permeable to water vapor, and is resistant to scuffing, checking and microcracking.

The novel coating composition of this invention is particularly useful in forming a protective coating on microporous polyurethane sheet materials. Microporous polyurethane sheet materials are primarily used as leather replacements in both men's and women's shoes, handbags, luggage, and the like. Prior art coating compositions in general break down under ordinary use, by microcracking, checking and flaking of the coating, particularly, when the coated microporous polymeric material is used as the upper for shoes. Obviously, this adversely affects the appearance of articles, such as shoes, made from coated polymeric materials and necessitates that these articles be frequently polished and buffed.

An unexpected problem arises because of microcracking and checking of the coating when shoes which are constructed of leather soles and uppers of a coated microporous polymeric material become wet. Residual salts in the leather sole wick up into the coated microporous polymeric upper of the shoe and exude out through the microcracks and checks of the coating. The salt deposit gives the shoes a dull white milky appearance, and is not easily removed; furthermore, the same situation reoccurs each time leather soles accumulate a significant amount of moisture. By using the coating composition of this invention, these aforementioned problems do not occur since this coating when applied to a microporous polymeric sheet material does not microcrack or check even under severe conditions of flexing such as at low temperatures of $-20°$ C.

The novel coating composition of this invention is an aqueous dispersion of a polymer of about 47–33% by weight butadiene, 47–66% by weight methyl methacrylate and 1–6% by weight of an $\alpha,\beta$-unsaturated carboxylic acid; the polymer has attached to the carbon atoms of the polymer backbone pendent monovalent radicals which are either aminoester radicals or hydroxyamide radicals or a combination of aminoester radicals and hydroxyamide radicals. The pendent aminoester radicals are of the formula:

FORMULA A

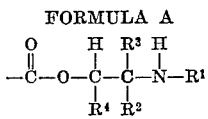

and the hydroxyamide radicals are of the formula:

FORMULA B

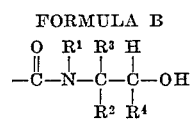

In the above formulas, $R^1$, $R^2$, $R^3$ and $R^4$ are each individually selected from the group of hydrogen and $C_1$–$C_5$ alkyl radicals and the above polymer has a nitrogen content of about 0.05 to 1% by weight. The novel coating composition is pigmented in a pigment volume concentration of 10 to 50%, has a pH of about 7 to 10 and contains about 0.3–10% by weight based on the weight of the polymer of at least one noinionic surfactant.

To form the novel coating composition of this invention, a latex of carboxylic polymer of methyl methacrylate, butadiene and the $\alpha,\beta$-unsaturated carboxylic acid is first formed. The term "latex" designates an aqueous dispersion of a water-insoluble polymer which is present in the form of very fine particles. This carboxylic polymer is then reacted with an aziridine compound which is often referred to as an alkylene imine. The carboxylic polymer after it has been reacted with the alkylene imine is referred to as an "iminated polymer."

One preferred polymer of the coating composition of this invention which has excellent physical properties contains about 40% by weight 1,3-butadiene and 56% by weight methyl methacrylate and about 4% by weight methacrylic acid which has been reacted with propylenimine to give a product having a nitrogen content of about 0.075–0.5% by weight.

Preferably, the novel product of this invention is formed by reacting the aziridine compound with the above carboxylic polymer latex under acidic pH conditions. Under these conditions, pendent monovalent aminoester radicals are formed by the reaction of the aziridine compound with the —COOH groups of the polymer. To stabilize the iminated latex, the pH of the latex is adjusted preferably to an alkaline pH of about 8–10 with a suitable base, such as ammonia. Rearrangement of the pendent aminoester radicals to hydroxyamide radicals often occurs under these alkaline conditions until equilibrium is reached which gives a product having both pendent isomeric aminoester radicals and hydroxyamide radicals. However, by using other reaction conditions, it is quite possible to form a polymer having all pendent hydroxyamide radicals or by keeping the above iminated latex at an acidic pH, it is possible to retain all of the pendent groups in the aminoester form.

Useful aziridine compounds have the following formula:

FORMULA C

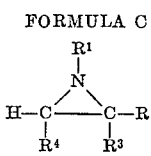

wherein $R^1$, $R^2$, $R^3$ and $R^4$ are as defined in Formula A.

Ethylenimine (Formula D) and 1,2 - propylenimine (Formula E), as shown hereinafter, are particularly preferred aziridines useful in this invention because of their relatively low cost and plentiful supply and because they tend to provide the final product with excellent adhesive properties.

FORMULA D    FORMULA E

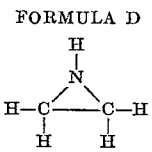 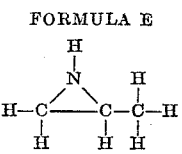

It is quite unexpected and surprising that the aziridine compound reacts effectively and efficiently with a carboxylic polymer in an aqueous dispersion since it is well known that aziridines are susceptible to hydrolysis and tend to polymerize in an aqueous media. It is recognized that a portion of the aziridine compound may hydrolyze and polymerize during the imination reaction and that these by-products, such as the aminoalcohol of the aziridine compound and a polymer of the aziridine compound, are present in the resulting polymer dispersion. Furthermore, it is recognized that these by-products interact to some extent with the iminated polymer and also tend to increase wet adhesion of the polymer. Also, it is recognized that under the preferred alkaline conditions, that the following salts are formed in the novel coating composition: salts of the unreacted carboxylic acid groups of the polymer, salts of the hydrolyzed alkylene imine, salts of polyalkylene imines, and an internal type salt, which can be termed a zwitter-ion, of the pendent carboxyl groups of the polymer chain and the pendent aminoester or hydroxyamide groups of the same or different polymer chain.

The carboxylic polymer is prepared by known methods of emulsion polymerization in which a carboxylic acid monomer is reacted in an aqueous medium with the copolymerizable butadiene and methyl methacrylate monomers. A wide variety of $\alpha,\beta$-unsaturated monovinylidene carboxylic acids can be used to provide carboxyl units to the polymer. Methacrylic acid, acrylic acid, crotonic acid and itaconic aid are the more practical species. Methacrylic acid and acrylic acid are preferred.

Known methods of making a carboxylic polymer latex useful in this invention are those described in U.S. Patents 2,395,017; 2,724,707; 2,787,603; 2,868,752; 2,868,754; 2,918,391 and 3,032,521, and the disclosures of which are incorporated herein by reference. Especially pertinent is the method described in U.S. 2,724,707, column 5, line 21 to column 6, line 60.

Typical well known reactants are used in preparing the carboxylic polymer latex such as suitable emulsification and suspension agents (surfactants), buffering agents for pH control and a free radical catalyst; for example, potassium persulfate, a peroxide such as hydrogen peroxide, a diazo compound, such as azobisisobutyroamidine hydrochloride or a redox type, such as persulfate-sulfite, or mixtures of such catalysts. Polymerization can be carried out in the presence of a free radical catalyst in a closed vessel in an inert atmosphere and under autogenous pressure or under artificially induced pressure or in an open vessel under reflux at atmospheric pressure. The temperatures of the polymerization can be varied from 0° C. or lower to 100° C. or higher, preferably from 20° C. to 90° C., depending to a large degree upon the activity of the monomers and catalyst used and the molecular weight desired in the polymer product.

The carboxylic polymer is produced in any molecular weight that is desired; usually the molecular weight is above 100,000 for polymers used as a coating composition on microporous polymeric materials.

To obtain a substantially water-insoluble carboxylic polymer and a stable latex, it is usually best to add less than 10% acid monomer based on the total weight of monomer in the reaction mixture, while insuring, in any event, that the polymer after the imination reaction contains at least 1% by weight of carboxylic monomer units. Thus, the iminated polymer is characterized by having an overall negative charge imparted to it by the pendent carboxyl radicals and has attached to the carbon atoms of the polymer backbone the aforementioned monovalent radicals.

The acid content of the carboxylic polymer can be determined by separating the polymer from the aqueous phase, dissolving it in a solvent and titrating the resulting polymer solution with alcoholic KOH to a phenolphthalein end-point. The acid content can also be determined by complete chemical analysis of the polymer.

In a typical procedure for carrying out the imination reaction, the aziridine compound is mixed with the carboxylic polymer latex in a reaction vessel under atmospheric pressure. The mixture is stirred and reacted at about 35 to 90° C. until the reaction is completed (e.g., about ½ hour at the higher temperatures to about 12 hours at the lower temperatures). Finally, the reaction product is cooled to room temperature. The entire reaction can be carried out at room temperature, but heating is much preferred because of the shorter reaction time.

After imination of the carboxylic polymer, the pH of the dispersion is adjusted by addition of a suitable base. Ammonia is convenient and preferable to use for this purpose but amines and alkaline materials, such as KOH, NaOH and morpholine can also be used.

To keep pigments and other additives dispersed, nonionic surfactants are used. Typical nonionic surfactants which may be used are listed in "Synthetic Detergents" by J. W. McCutcheon, published annually by MacNair-Dorland Company, New York. One preferred nonionic surfactant is octyl phenyl polyglycol ether.

The novel coating composition can be applied to materials or articles by any of the well-known methods for example, by spraying, roller coating, dipping, swabbing, brushing, or padding. The coated material is then dried, preferably in a heat zone.

The novel composition of this invention is particularly useful as a coating for a microporous polymeric sheet material used as a leather replacement. The thickness of the dried coating on a microporous polymeric substrate is about 0.1–1 mil but preferably the coating thickness is about 0.3–0.5 mil. In most instances to obtain these dried coating thicknesses, the coating composition is applied at about 0.1–1.0 oz./yd.² When the microporous material is used as a leather replacement in shoes, it is preferable to apply the coating in two separate layers; the first layer contains a large amount of pigment, such as titanium dioxide for hiding defects on the surface of the microporous sheet material while the second coat contains the desired pigments to provide the necessary color for the material. Preferably, a top coating is applied to the coated microporous sheet, such as cellulose acetate butyrate, to provide a glossy finish.

Preferably a microporous sheet material of a polyurethane polymer is used. One process for making a microporous polyurethane sheet material is disclosed in U.S. Patent 3,100,721 to E. K. Holden. The polymer is a polyurethane either alone or in a mixture with other polymers, such as a vinyl chloride polymer. One class of polyurethanes useful in this invention are polyureas, that is, polyurethanes containing the recurring structural unit:

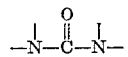

The prepolymers for the polyurethanes are prepared by mixing one or more polyalkyleneether glycols or hydroxyl-terminated polyesters with a molar excess of organic diisocyanate and heating the mixture to a temperature of about 50–100° C. to form a prepolymer having terminal-NCO groups. An alternate procedure is to react the diisocyanate with a molar excess of polyalkyleneether glycol or polyester, then cap the resulting product, that is, react it with more diisocyanate to form a prepolymer having terminal-NCO groups.

The preferred polyurethanes are the chain extended polyurea type which are formed from aliphatic polyol segments which include the polyalkyleneether glycols having $C_3$–$C_{12}$ alkylene segments and the hydroxyl-terminated polyester of $C_3$–$C_{12}$ acyclic dicarboxcyclic acid and $C_3$–$C_{12}$ alkylene glycol. Polyalkyleneether glycols are the preferred active hydrogen containing material for the prepolymer formation. The most useful polyglycols have a molecular weight of 300 to 5000, preferably 400 to 2000; some of these polyglycols are, for example, polyethyleneether glycol, polypropyleneether glycol, polytetramethyleneether glycol, polyhexamethyleneether glycol, polydecamethyleneether glycol, polydodecamethyleneether glycol, and mixtures thereof. Polyglycols containing several different radicals in the molecular chain such as the compound $HO(CH_2OC_2H_4O)_nH$ wherein $n$ is an integer greater than 1 can also be used.

The preferred polyurethanes are prepared with at least a major portion of an aromatic, aliphatic or cycloaliphatic diisocyanates or mixtures thereof; for example, tolylene-2,4-diisocyanate, tolylene-2,6-diisocyanate, m-phenylene diisocyanate, biphenylene-4,4′-diisocyanate, methylene bis-(4-phenyl isocyanate), 4-chloro-1,3-phenylene diisocyanate, naphthalene-1,5-diisocyanate, tetramethylene-1,4-diisocyanate, hexamethylene-1,6-diisocyanate, decamethylene-1,10-diisocyanate, cyclohexylene - 1,4 - diisocyanate, methylene bis-(4-cyclohexyl isocyanate) and tetrahydronaphthalene diisocyanate. Arylene diisocyanates in which the isocyanate groups are attached to an aromatic ring are preferred since these isocyanate react more readily than do alkylene diisocyanate.

Polyesters can be used instead of or in conjunction with the polyalkyleneether glycols, particularly those formed by reacting acids, esters or acid halides with glycols. Suitable glycols are polyalkylene glycols, such as methylene-, ethylene-, propylene-, tetramethylene-, decamethylene glycol; substituted polyalkylene glycols, such as 2,2-dimethyl-1,3-propanediol; cyclic glycols, such as cyclohexanediol and aromatic glycols, such as xylylene glycol. Aliphatic glycols are generally preferred when maximum product flexibility is desired and when making microporous articles. These glycols are reacted with aliphatic, cycloaliphatic or aromatic dicarboxylic acids or lower alkyl esters or ester forming derivatives to produce relatively low molecular weight polymers, preferably having a melting point of less than about 70° C., and molecular weights like those indicated for the polyalkyleneether glycols. Acids for preparing such polyesters are succinic, adipic, suberic, sebacic, terephthalic and hexahydroterephthalic acids and the alkyl and halogen substituted derivatives of the acids.

Hydrazine is preferred as the chain extending agent for the preferred polyurethanes, although $C_1$–$C_6$ (including cycloaliphatic) diamines, such as ethylene diamine, hexamethylene diamine and dimethyl piperazine and 1,4-diamino/piperazine can also be used advantageously either alone or in a mixture with hydrazine.

A particularly preferred chain extender which is reacted with the isocyanates terminated prepolymer has the structural formula

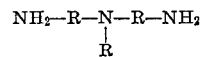

wherein R is an alkyl group containing 1–4 carbon atoms (i.e., a methyl, ethyl, propyl or butyl group). In the preferred compound, the R beneath the central N is methyl and the other two R's are propyl; thus, the preferred compound is N-methyl-amino-bis-propylamine.

This chain extender need not consist entirely of a compound having the formula shown above. It is usually best to use a blend of a minor proportion, preferably about 5–30 mole percent, of the above preferred chain extender with a major proportion, about 95–70 mole percent, of another compound having two active hydrogen atoms bonded to amino-nitrogen atoms, preferably hydrazine. Other chain-extending compounds which can be used along with the preferred compound are monosubstituted hydrazines, dimethyl-piperazine, 4-methyl-m-phenylene-diamine, m-phenylene-diamine, 4,4′-diamino - diphenyl-methane, 1,4-diamino-piperazine, ethylene diamine and mixtures thereof. A particularly preferred chain extender is a mixture of about 80 mole percent hydrazine and 20 mole percent N-methyl-amino-bis-propylamine.

Mixtures of at least one vinyl polymer with a polyurethane can be used to prepare the microporous sheet material. Such mixtures, preferably containing polyvinyl chloride as the vinyl polymer, can contain from 1 to 2% of vinyl chloride polymer to about 50% thereof. Preferably such mixtures contain at least about 50% by weight of the polyurethane.

Preferably microporous polyurethane sheet materials used as a leather replacement contain a porous fibrous substrate to give the material the rigidity and strength required for this use. Such substrates are, for example, woven, twills, drills and ducks; jersey, tricot and knitted materials; felts, needle punched batts, porous batts impregnated with synthetic resins, such as styrene/butadiene, acrylic, vinyl halide, and polyurethane polymers. The choice of the particular fibers from which the substrate is made is not critical; they include those made from polyamides, polyesters, polyesteramides, acrylic polymers, viscose rayon, wool, cotton, glass and mixture thereof. Elastomeric fibers and elastic fibers can be also used. Porous non-woven, needle punched, heat shrunk batts of polyethylene terephthalate fibers impregnated with one or more of the aforementioned polymers are particularly preferred. The preferred sheet material contains about 30–60% fiber by weight and about 70–40% of a microporous polyurethane polymer.

The examples which follow illustrate the invention. All quantities are on a weight basis unless otherwise indicated.

EXAMPLE 1

A coating composition is prepared by first forming a latex of a carboxylic polymer having a composition of 56:40:4 methyl methacrylate:1,3 - butadiene:methacrylic acid and then iminating this carboxylic polymer latex with an alkylene imine. This latex is then mixed with pigments to form a coating comopsition.

Latex A

| Portion 1: | Parts by weight |
|---|---|
| Sodium metabisulfite | 0.71 |
| Anionic surfactant, 30% aqueous solution of Triton 770 (sodium alkylaryl polyether sulfate) | 9.16 |
| Deionized water | 362.85 |
| Portion 2: | |
| 1,3-butadiene | 115.28 |
| Methyl methacrylate | 161.38 |
| Methacrylic acid | 11.52 |
| Anionic surfactant, 30% aqueous solution of Triton 770 (sodium alkylaryl polyether sulfate) | 9.61 |
| Deionized water | 75.66 |
| Portion 3: | |
| Ammonium persulphate | 2.16 |
| Deionized water | 35.00 |
| Portion 4: | |
| Ammonium persulphate | 0.72 |
| Deionized water | 12.00 |
| Portion 5: | |
| Ammonium hydroxide (25% aqueous solution) | 2.12 |
| Portion 6: | |
| Propylenimine | 7.64 |
| Portion 7: | |
| Ammonium hydroxide (25% aqueous solution) | 18.05 |
| Portion 8. | |
| Nonionic surfactant, 34% aqueous solution of Triton 100 (octyl phenyl polyglycol ether) | 34.19 |
| Total | 858.50 |

When necessary, the portion is premixed before it is added. Portion 1 is charged into a conventional polymerization reaction vessel equipped with stirrer, thermometer, and means to introduce nitrogen and reagents. The following polymerization reaction is carried out under an atmosphere of nitrogen.

Portion 1 is heated to about 60° C. with constant stirring and about 6% of portion 2 is added with continuous stirring while maintaining the temperature at about 65° C. Portion 3 is added with stirring and the temperature of the mixture is slowly raised to about 70 to 72° C. The remainder of portion 2 is gradually added over about a 2¾ hour period while maintaining the temperature of the contents in the vessel at about 70 to 72° C. The mixture is maintained at about 70 to 72° C. for an additional 2½ hours and then portion 4 is added and the mixture is held at 70 to 72° C. for an additional 20 minutes. The temperature of the mixture is raised to about 80° C. and portions 5, 6, and 7 are each then slowly added consecutively while keeping the mixture at about 80° C. The mixture is then cooled to about 35° C. and portion 8 is added and the mixture is agitated for an additional 30 minutes. The mixture is filtered through a 100 mesh screen.

The completed Latex A has a total solids content of about 36%, a pH of about 10, a relative viscosity of about 1.15, and a Brookfield viscosity using a No. 1 spindle at 60 r.p.m. of about 8–15 centipoises.

Primer coating composition 1 is formed by mixing pigment dispersions with the Latex A as follows:

| | Parts by weight |
|---|---|
| Deionized water | 133 |
| "Monastral" Red B dispersion (15% by weight aqueous dispersion of gamma linear quinacridone prepared according to the process of U.S. Patent 2,844,581) | 81 |
| "Monastral" Blue BB dispersion (20% by weight aqueous dispersion of β-copper phthalocyanine, C.I. Pigment Blue 15) | 19 |
| Carbon black dispersion (20% by weight aqueous dispersion of carbon black) | 29 |
| Titanium dioxide dispersion (70% by weight aqueous dispersion titanium dioxide) | 28 |
| Latex A | 210 |
| Total | 500 |

The above ingredients are introduced into a mixing tank in the order shown and uniformly blended.

Base coating composition 2 is formed by mixing the following:

| | Parts by weight |
|---|---|
| Deionized water | 254 |
| "Monastral" Red B dispersion (15% by weight aqueous dispersion of gamma linear quinacridone, prepared according to the process of U.S. Patent 2,844,581) | 56 |
| "Monastral" Blue BB dispersion (20% by weight aqueous dispersion of β-copper phthalacyanine, C.I. Pigment Blue 15) | 8 |
| Carbon black dispersion (20% by weight aqueous dispersion carbon black) | 13 |
| Latex A | 169 |
| Total | 500 |

The above ingredients are introduced into a mixing tank in the order shown and uniformly blended.

A roll of microphorous polyurethane sheet material about 42 inches wide is made in accordance with the teachings in Example I of U.S. Patent 3,100,721 to E. K. Holden. The resulting product is a porous impregnated non-woven mat of heat shrunk polyethylene terephthalate fibers impregnated with a microporous polyurethane polymer and is uniformly coated on one side with about 20 mils of a microporous polyurethane polymer.

Primer coating composition 1 is sprayed on one square yard sample of the above prepared microporous polyurethane sheet material at 0.15 oz./square yard and is dried at about 100° C. Base coating composition 2 is then sprayed on top of the dried primer coating composition 1 at 0.15 oz./square yard and the coating is dried at about 100° C. The total thickness of the coatings 1 and 2 is about 0.3 mil. A finish topcoat of cellulose acetate butyrate is then sprayed on top of the two coatings at about 0.1 oz./square yard and is dried at about 100° C.

The resulting coating on the microporous polyurethane sheet material does not break or crack when the sheet is subjected to flexing and stressing even under low temperatures and has excellent resistance to abrasion both in the wet and dry condition. The coated sheet has a water vapor permeability value of about 2500 grams/hour/square meter.

EXAMPLE II

The following iminated carboxylic polymer latices are prepared according to the process of Example 1 using the identical polymerization catalysts and polymerization conditions and the same imination conditions, except the following monomers are used to form the carboxylic polymer latices:

| Latex | Monomers | Proportions |
|---|---|---|
| B | Methylmethacrylate:ethyl acrylate:methacrylic acid (MMA/EA/MAA). | 39/57/4 |
| C | Methylmethacrylate:2-ethylhexyl acrylate:methacrylic acid (MMA/2-EHA/MAA). | 44/52/4 |
| D | Methylmethacrylate:butadiene:methacrylic acid (MMA/BD/MAA). | 60/36/4 |
| E | Methylmethacrylate:butyl acrylate:methacrylic acid (MMA/BA/MAA). | 39/57/4 |

Each of these polymers is formulated into a primer coating composition 1 and a base coating composition 2 by using the same pigment dispersions and the same procedure of Example I; for example, iminated Latex B is formulated into primer coating composition 1 using the primer coating composition 1 formulation of Example I except Latex B is used for Latex A.

Each of the above-prepared primer coating compositions are sprayed on separate sheets of the microporous polyurethane material prepared as in Example I at about 0.15 oz./square yard. After this coating is dried, each of the corresponding base coating compositions are sprayed on the coated microporous sheet material at about 0.15 oz./square yard and are dried. Also, each of the coated sheets are finished with a top coating of cellulose acetate butyrate.

Each of the coated microporous polyurethane sheet materials including the coated sheet material prepared in Example I are subjected to the following tests and the results of the tests are recorded in Table I.

Bally Flexometer Test.—The Bally Flexometer provides a rolling, folding type of action in which a metal finger pushes into the sample from the back while the sample is rocked up and down. The samples are inspected after 40,000 flexes. Appearance of cracks in the finish and also failure of actual finish bly flaking, generally around the area where the metal finger is pushed into the material, is recorded.

Permeability Value Determination.—Permeability value of the coated microporous polyurethane sheet material is determined by weight increase of $CaCl_2$ due to moisture pickup in an upright cup stored at 90% R.H. in a constant temperature room which is at about 72° F. A two-hour period is used to make the determination and a permeability value in grams of water per hour per square meter of material is calculated.

Cold Cracking Test.—The coated sheet material is subjected to a −20° F. temperature and while the sheet is at this temperature, the sheet is folded 180 degrees with the coated surface being the outer side of the sheet after it is folded. The sheet is then returned to a straight or flat position and the coating is examined for micro cracks and breaks. This test applies a severe tensile stress to the coating while it is under a low temperature.

Wet Abrasion Test.—This test abrades the surface of the coated microporous polyurethane sheet material while in a wet condition. Prior to testing, the samples are soaked one hour in water. A sample is fastened onto a half-round cylinder weighing approximately two pounds. The cylinder is pushed back and forth across a Wellington-Sears No. 10 duck cloth. Under these conditions, the sample is subjected to about a two-pound load per linear inch. After fifty strokes, the samples are examined for abrasion of the surface of the coating. Each of the above coatings on the microporous polyurethane sheet materials shows good to excellent abrasion resistance. Since the test illustrates that all of the coatings have comparable abrasion resistance, the results are not recorded in table below.

In general, the aforementioned tests illustrate that a microporous polyurethane sheet material coated with the novel composition of this invention has superior flex and crack resistance even under severe test conditions such as low temperatures of −20° F. when compared with similarly prepared coating compositions which are not within the scope of this invention. Also, the wet abrasion test illustrates that all of the iminated polymeric coatings have good to excellent abrasion resistance.

TABLE I

| Polymeric coating compositions | Ratio | Bally flex. (40,000 flexes) | Cold cracking, −20° F. | Permeability value (grams/hr./m.²) |
|---|---|---|---|---|
| Polymer A, MMA/BD/MAA | 56/40/4 | 0 | 0 | 2,500 |
| Polymer B, MMA/EA/MAA | 39/57/4 | 2.0 | 2 | 3,500 |
| Polymer C, MMA/2-EHA/MAA | 44/52/4 | 1.0 | 1 | 2,500 |
| Polymer D, MMA/BD/MAA | 60/36/4 | 0 | 0 | 2,500 |
| Polymer E, MMA/BA/MAA | 39/57/4 | 1.5 | 2 | 2,900 |

Rating system: 0—no cracks, 1—Microcracks, 2—some visual cracks plus microcracks, 3—severe visual cracks.

I claim:
1. A microporous polymeric sheet material reinforced with fibers coated on at least one side with a dried layer of a coating compoistion consisting essentially of an aqueous dispersion of
(a) a polymer of 47–33% by weight butadiene, 47–66% by weight methyl methacrylate and 1–6% α,β-unsaturated carboxylic acid, the polymer having attached to the carbon-carbon chain pendent monovalent radicals selected from the group consisting of radical A of the formula

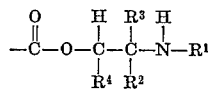

radical B of the formula

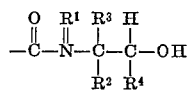

and a mixture of radicals A and B wherein $R^1$, $R^2$, $R^3$ and $R^4$ are each individually selected from the group consisting of hydrogen and $C_1$–$C_5$ alkyl radicals; and
(b) pigment in a pigment volume concentration of 10–50%;
said polymer having a nitrogen content of about 0.05–1% by weight; said dispersion having a pH of 7–10 and containing about 0.3–10% by weight based on the weight of the polymer of at least one nonionic surfactant.

2. A microporous polymeric sheet material reinforced with fibers coated on at least one side with a dried layer of said coating composition of claim 1 and having a finishing coat superimposed over said dried layer.

3. The coated microporous sheet material of claim 2 in which the polymer of said sheet material is a blend of at least 50% by weight polyurethane and up to 50% by weight polyvinyl chloride.

4. The coated sheet material of claim 3 in which the polyurethane is formed by reacting an organic diisocyanate with an active hydrogen containing polymeric material selected from the group consisting of polyalkyleneether glycols and hydroxyl terminated polyesters to produce an isocyanate-terminated polyurethane prepolymer, and reacting the resulting prepolymer by mixing with a chain-extender comprising a compound having the formula

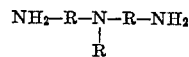

where R is a $C_1$–$C_4$ saturated aliphatic group.

5. The coated sheet material of claim 4 in which the chain-extender for the polyurethane polymer consists essentially of N-methylamino-bis-propylamine and hydrazine.

6. The coated sheet material of claim 1 in which $R^1$, $R^2$, $R^3$ and $R^4$ are hydrogen.

7. The coated sheet material of claim 1 in which $R^1$, $R^3$ and $R^4$ are hydrogen and $R^2$ is methyl.

8. A microporous sheet material of a polyurethane polymer reinforced with polyethylene terephthalate fibers said microporous sheet material coated with a dried layer of a coating composition consisting essentially of an aqueous dispersion of (a) a polymer of 40% by weight of 1,3-butadiene, 56% by weight of methyl methacrylate and 2% by weight of methacrylic acid, the polymer having attached to the carbon-carbon chain pendent monovalent radicals selected from the group consisting of

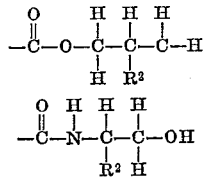

and a mixture of said radicals, wherein $R^2$ is hydrogen or methyl and wherein said polymer has a nitrogen content of 0.075 to 0.5% by weight; and (b) pigment in a pigment volume concentration of 10-50%;

said dispersion having a pH of 7-10 and containing about 0.3-10% by weight based on the weight of the polymer of at least one nonionic surfactant.

References Cited

UNITED STATES PATENTS

| | | | |
|---|---|---|---|
| 3,000,757 | 9/1961 | Johnston et al. | 117—63 |
| 3,100,721 | 8/1963 | Holden. | |
| 3,261,796 | 7/1966 | Simms | 260—29.7 |
| 3,261,797 | 7/1966 | McDowell et al. | 260—29.7 |

WILLIAM D. MARTIN, Primary Examiner

R. HUSACK, Assistant Examiner

U.S. Cl. X.R.

117—135.5, 138.8, 161; 260—29.7

PO-1050
(5/69)

UNITED STATES PATENT OFFICE
CERTIFICATE OF CORRECTION

Patent No. 3,455,727      Dated July 15, 1969

Inventor(s) John I. Dye

It is certified that error appears in the above-identified patent and that said Letters Patent are hereby corrected as shown below:

Column 10, lines 36-39, the formula should appear as follows:

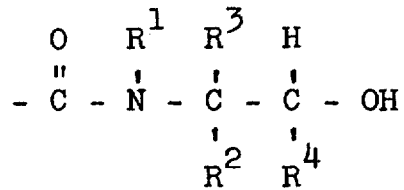

Column 11, lines 13-17, the formula should appear as follows:

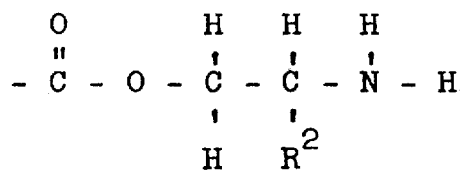

SIGNED AND
SEALED
MAY 26 1970

(SEAL)
Attest:

Edward M. Fletcher, Jr.
Attesting Officer

WILLIAM E. SCHUYLER, JR.
Commissioner of Patents